United States Patent
Kojima et al.

(10) Patent No.: US 7,758,124 B2
(45) Date of Patent: Jul. 20, 2010

(54) SEAT APPARATUS FOR VEHICLE

(75) Inventors: Yasuhiro Kojima, Kariya (JP); Hideo Nihonmatsu, Anjo (JP); Mikihito Nagura, Okazaki (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 316 days.

(21) Appl. No.: 12/054,688

(22) Filed: Mar. 25, 2008

(65) Prior Publication Data

US 2008/0238171 A1 Oct. 2, 2008

(30) Foreign Application Priority Data

Mar. 30, 2007 (JP) .............................. 2007-090625

(51) Int. Cl.
*B60N 2/22* (2006.01)
(52) U.S. Cl. ............................... 297/367 R; 297/378.12
(58) Field of Classification Search ............. 297/367 R, 297/367 L, 362
See application file for complete search history.

(56) References Cited

U.S. PATENT DOCUMENTS

| | | | | |
|---|---|---|---|---|
| 5,755,491 | A * | 5/1998 | Baloche et al. | ......... 297/367 R |
| 5,997,090 | A | 12/1999 | Baloche et al. | |
| 6,474,740 | B1 | 11/2002 | Kondo et al. | |
| 6,726,281 | B2 * | 4/2004 | Baloche | ................... 297/367 R |
| 7,490,907 | B2 * | 2/2009 | Nagura et al. | ........... 297/367 R |
| 2008/0093903 | A1 | 4/2008 | Fujioka et al. | |

FOREIGN PATENT DOCUMENTS

| | | |
|---|---|---|
| DE | 100 28 119 A1 | 1/2001 |
| DE | 10 2004 025 179 A1 | 12/2005 |
| EP | 1 806 072 A1 | 7/2007 |
| FR | 2 888 173 A1 | 1/2007 |
| JP | 8-214981 | 8/1996 |

\* cited by examiner

*Primary Examiner*—Anthony D Barfield
(74) *Attorney, Agent, or Firm*—Oblon, Spivak, McClelland, Maier & Neustadt, L.L.P.

(57) ABSTRACT

A seat apparatus for a vehicle includes a seat cushion, a lower arm, a seat back, an upper arm, an intermediate arm, a reclining mechanism, and a lock mechanism. The lock mechanism includes a first plate member, a second plate member, and a pawl gear. The first plate member is fixed to one of the upper arm and the intermediate arm to be provided therein with a plurality of internal tooth sections each of which has a plurality of teeth with different widths. The second plate member is fixed to the other one of the upper arm and the intermediate arm so as to be supported by the first plate member to rotate relative thereto. The pawl gear is supported by the second plate member and has an external tooth section each of which has a plurality of teeth with different widths for engaging with the internal tooth sections.

3 Claims, 6 Drawing Sheets

Locked condition in a normal position

FIG. 5

While folding forward

FIG. 6

Right before completion of forward folding movement

FIG. 7

Locked condition in a forward folded position

SEAT APPARATUS FOR VEHICLE

CROSS REFERENCE TO RELATED APPLICATIONS

This application is based on and claims priority under 35 U.S.C. §119 to Japanese Patent Application 2007-090625, filed on Mar. 30, 2007, the entire contents of which are incorporated herein by reference.

FIELD OF THE INVENTION

The present invention relates to a seat apparatus for a vehicle. In particular, the present invention pertains to the seat apparatus in which a seat back can be tilted in two modes so as to be selectively positioned between a reclined position and a forward folded position.

BACKGROUND

A conventional seat apparatus for a vehicle has a reclining mechanism for adjusting a tilt angle of a seat back to a desired tilt angle in order to secure a comfortable sitting position and a safe driving posture for an occupant. Moreover, some of the seat apparatuses for vehicles have a two-mode folding mechanism for folding a seat back so as to be positioned in a reclined position and a forward folded position. The seat back is folded forward to be approximately parallel to a seat cushion by means of the two-mode folding mechanism so that a back face of the seat back can be used as a table and that a loading space for luggage can be created.

In particular, for example, a conventionally known seat apparatus for a vehicle described in JP8214981A includes a base plate (a lower arm) supported on a seat cushion, an upper arm supported on a seat back, and a lower arm supported on the base plate via a first hinge shaft (i.e., a center shaft) and rotatably supported on the upper arm via a second hinge shaft each serving as a component of a lock mechanism. The lock mechanism is configured as follows. In the lock mechanism, the lower arm is rotated via the first hinge shaft while the upper arm is rotated via the second hinge shaft. The upper arm is tilted forward relative to the lower arm so as to cover the lower arm. While a reclining mode is set, the upper arm and the lower arm are simultaneously rotated with each other. Only the upper arm is rotated in order to fold the seat back forward.

Further details of the lock mechanism will be explained as follows. The lower arm and the upper arm are connected to each other via an upper base plate. Teeth for restraining and locking a forward tilting movement of the upper arm are formed at an upper position on an outer periphery of the upper base plate. Teeth for keeping and locking the forward tilting movement of the upper arm are formed at a forward position in an intermediate part on the outer periphery of the upper base plate. A lower side of the upper base plate is fixed to the lower arm. A tooth member is attached to the upper arm to be located at an upper portion of the upper base plate. The tooth member includes teeth at one end engaging with and disengaging from the teeth of the upper base plate. The other end of the tooth member is located at an opposite side of the teeth so as to be rotatably supported on a shaft arranged at the upper arm. The tooth member is rotated around the shaft. Furthermore, a lever for folding the seat back forward and a cam mechanism connected to the lever are disposed at an upper end portion of the tooth member. The lever and the cam mechanism are rotated around a shaft arranged at the upper arm. An approximately triangular shape holder plate having the second hinge shaft and two of the above-mentioned shafts as apexes is disposed in an interior side (in a central side of the seat) of the upper base plate, the tooth member, and the cam mechanism so as to engage with and overlap one another. When the seat back is being folded forward, the tooth member is rotated via the cam mechanism by operating the lever, thereby disengaging the teeth of the tooth member from the teeth of the upper base plate. Then, in accordance with a forward folding movement of the seat back, the lever, the cam mechanism, the tooth member, and the holder plate are rotated along with the upper arm around the second hinge shaft.

When the seat back is used as the table, a position of the seat back is switched from a seated position to a forward folded position (a table position) and vice versa. In this case, the seat back may not be tilted smoothly in the process of switching the position of the seat back from the seated position to the forward folded position (the table position) and vice versa.

Moreover, the reclining mechanism of the seat apparatus is easily assembled to the seat because the reclining mechanism is generally unitized. However, the lock mechanism for folding the seat back forward is not unitized as disclosed in the above-mentioned patent document. During assembling of the seat, various components of the lock mechanism are separately assembled to the seat. In the case where the lock mechanism is not unitized, some of the components may be forgotten to be attached to the seat and a wide space is required in order to arrange the components as well as costs increase because the number of fasteners used for fastening the lock mechanism to the seat increases. Additionally, since the components of the lock mechanism for folding the seat forward are not unitized, the lock mechanism is not strong enough to resist against impact load in a width direction of the seat. Accordingly, reinforcing components against the impact load are required.

A need thus exists for a seat apparatus for a vehicle, which is not susceptible to the drawback mentioned above.

SUMMARY OF THE INVENTION

According to an aspect of the present invention, a seat apparatus for a vehicle includes a seat cushion, a lower arm supported on the seat cushion, a seat back, an upper arm supported on the seat back, an intermediate arm having a first hinge shaft and a second hinge shaft on which the lower arm and the upper arm are rotatably mounted respectively, and a reclining mechanism disposed between the lower arm and the intermediate arm. The reclining mechanism selectively restrains and allows the intermediate arm to rotate around the first hinge shaft relative to the lower arm for adjusting a tilt angle of the seat back relative to the seat cushion within a predetermined angular range. The seat apparatus further includes a lock mechanism disposed between the intermediate arm and the upper arm. The lock mechanism selectively restrains and allows the upper arm to rotate around the second hinge shaft relative to the intermediate arm for establishing a folding movement of the seat back onto the seat cushion. The lock mechanism includes a first plate member, a second plate member, and a pawl gear. The first plate member is fixed to one of the upper arm and the intermediate arm. The first plate member is provided therein with a plurality of circumferentially spaced internal tooth sections each of which has a plurality of teeth with different face widths. The second plate member is fixed to the other one of the upper arm and the intermediate arm. The second plate member is supported by the first plate member to rotate relative thereto. The pawl gear is slidably supported by the second plate member and has a circumferentially arranged external tooth section each of which has a plurality of teeth with different face widths for engaging with and disengaging from one of the internal tooth sections.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention will be explained with reference to the illustrations of the drawing figures as follows. Directions such as upper, lower, width, forward, and rearward described below are based upon directions in a vehicle.

A seat apparatus for a vehicle (hereinafter simply referred to as a "seat apparatus 1") according to the embodiment will be explained as follows with reference to FIGS. 1 through 4. In the embodiment, the seat apparatus 1 is specifically applied as a seat slide apparatus mounted to a front seat for a vehicle.

Figure 1:
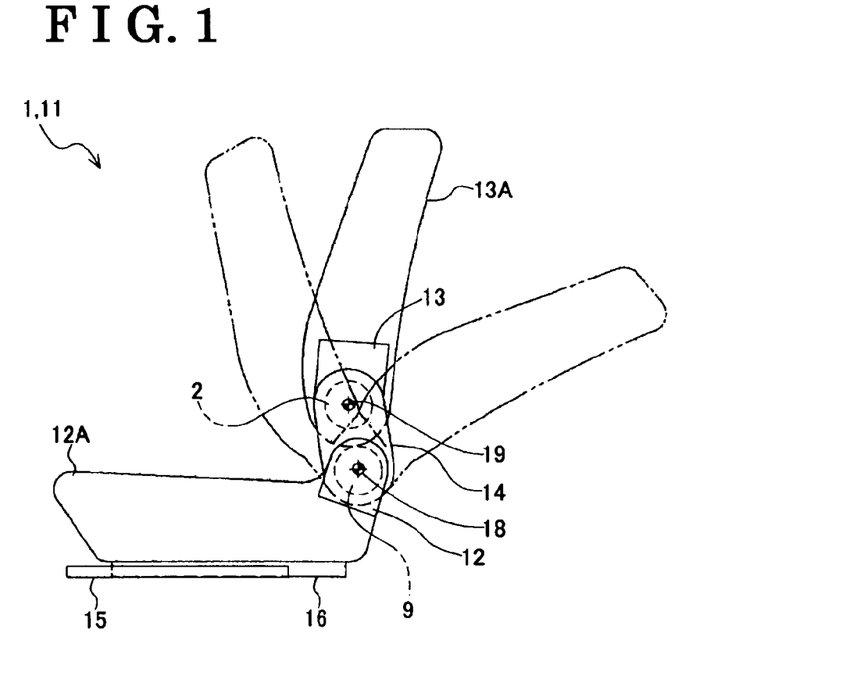
FIG. 1 is a configuration diagram illustrating a seat apparatus for a vehicle according to an embodiment of the present invention.

The seat apparatus 1 according to the embodiment includes a seat cushion 12A, a lower arm 12, a seatback 13A, an upper arm 13, an intermediate arm 14, a reclining mechanism 9, and a lock mechanism 2 as illustrated in FIG. 1.

The lower arm 12 is supported on the seat cushion 12A of a vehicle seat 11. In addition, the lower arm 12 is supported on an upper rail 16 slidably engaging with a lower rail 15 supported on a vehicle floor (not shown).

The upper arm 13 is supported on the seat back 13A of the vehicle seat 11 and is located at an upper portion of the lower arm 12.

The intermediate arm 14 is located at the upper portion of the lower arm 12 and at a lower portion of the upper arm 13. The intermediate arm 14 is connected to a first hinge shaft 18 and a second hinge shaft 19. Accordingly, the intermediate arm 14 is rotatably supported by the lower arm 12 and the upper arm 13 via the first hinge shaft 18 and the second hinge shaft 19 respectively. The first hinge shaft 18 is located at the upper portion of the lower arm 12 and at a lower portion of the intermediate arm 14 so as to support and connect the lower arm 12 and the intermediate arm 14 to each other. The second hinge shaft 19 is located at the lower portion of the upper arm 13 and at an upper portion of the intermediate arm 14 so as to support and connect the upper arm 13 and the intermediate arm 14 to each other.

The reclining mechanism 9 is disposed between the lower arm 12 and the intermediate arm 14 to allow and restrain rotation of the intermediate arm 14 around the first hinge shaft 18 relative to the lower arm 12. Accordingly, an angle of the seat back 13A relative to the seat cushion 12A is adjusted to a predetermined angle within a predetermined angle range.

Figure 2:
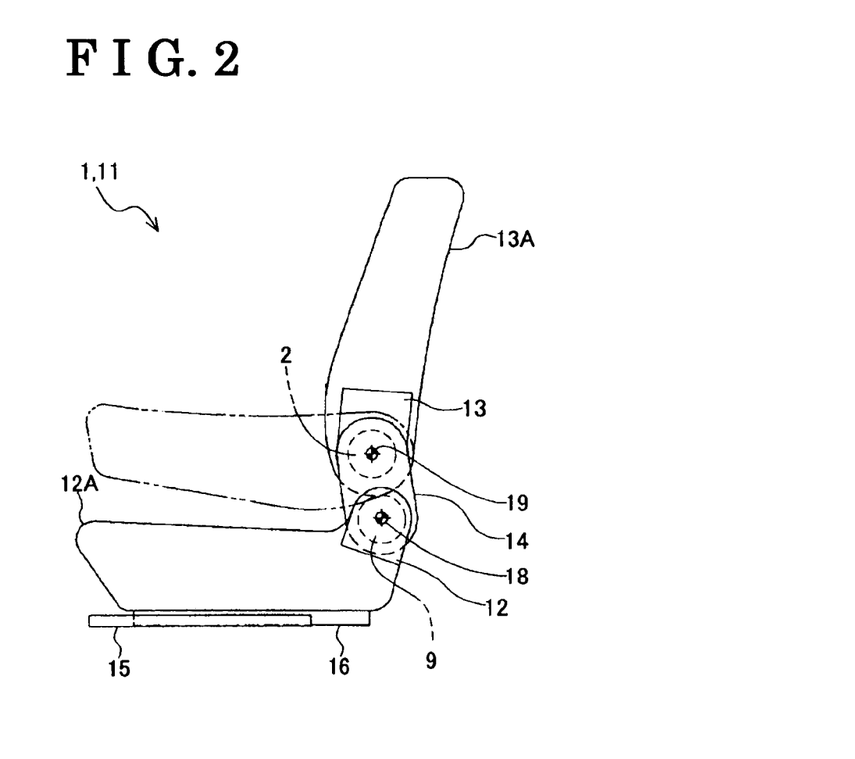
FIG. 2 illustrates a condition where a seat back (an upper arm) of the seat apparatus according to the embodiment of the present invention is folded forward.

The lock mechanism 2 is disposed between the upper arm 13 and the intermediate arm 14 to allow and restrain rotation of the upper arm 13 around the second hinge shaft 19 relative to the intermediate arm 14. Accordingly, a forward folding movement of the seat back 13A onto the seat cushion 12A (a forward rotation, which is beyond a forward rotational limit of the seat back 13A tilted by the reclining mechanism 9 within a predetermined angular range as illustrated FIG. 1) is allowed by the lock mechanism 2 as illustrated in FIG. 2. The lock mechanism 2 includes an upper gear 3 serving as a first plate member, a lower plate 4 serving as a second plate member, pawl gears 5, a cam 6, a spiral spring 7, and a ring 8.

The upper gear 3 includes a dish shape having recessed portions. The recessed portions of the upper gear 3 are arranged so as to face the intermediate arm 14 and have stepwise-reduced diameters and two ring-shaped inner circumferential surfaces axially parallel to the second hinge shaft 19. A through-hole 3 through which the second hinge shaft 19 extends is formed in the center of the recessed portion of the upper gear 3 seen in FIG. 3A. The upper gear 3 includes six circular raised portions (not shown) formed at an axially opposite surface of the recessed portion disposed most radially inward side and facing the upper arm 13. Three internal tooth sections 31 approximately circumferentially spaced apart from one another are formed on the inner circumferential surface disposed most radially outwardly in the upper gear 3. Three circular arc portions 32 not having the internal tooth section 31 and disposed between the internal tooth sections 31 are formed also on the inner circumferential surface disposed most radially outwardly in the upper gear 3. The circular raised portions are fitted in the upper arm 13 so as to be fixed thereto, thereby restraining the upper gear 3 from being relatively rotated to the upper arm 13. The internal tooth sections 31 and the circular arc portions 32 are alternately arranged in a circumferential direction on the inner circumferential surface disposed most radially outwardly in the upper gear 3.

Figure 3A:
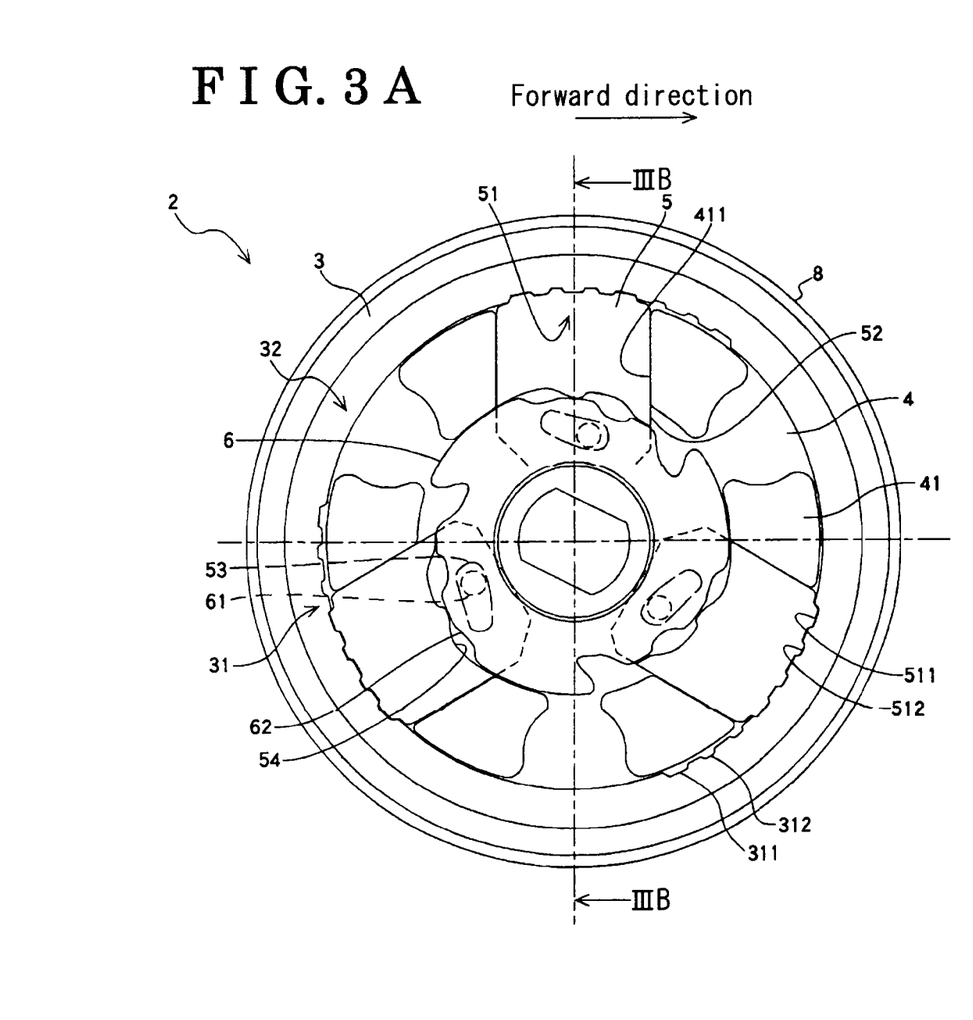
FIG. 3A illustrates a lock mechanism of the seat apparatus according to the embodiment of the present invention viewed from an intermediate arm.
Figure 3B:
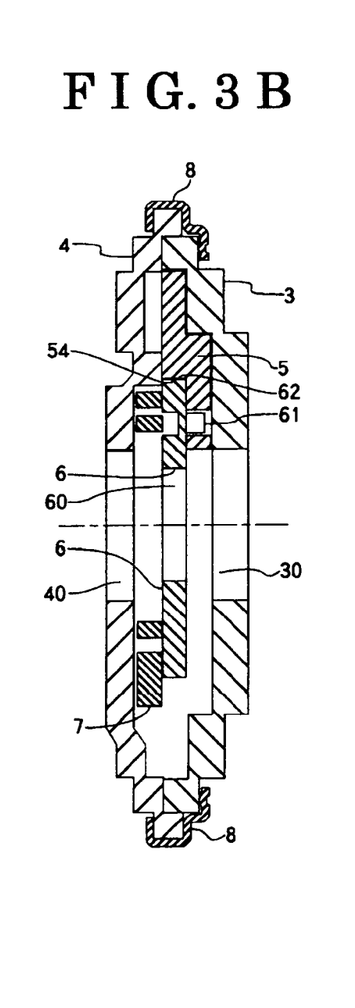
FIG. 3B is a cross-sectional view taken along the line IIIB-IIIB of FIG. 3A.
Figure 4:
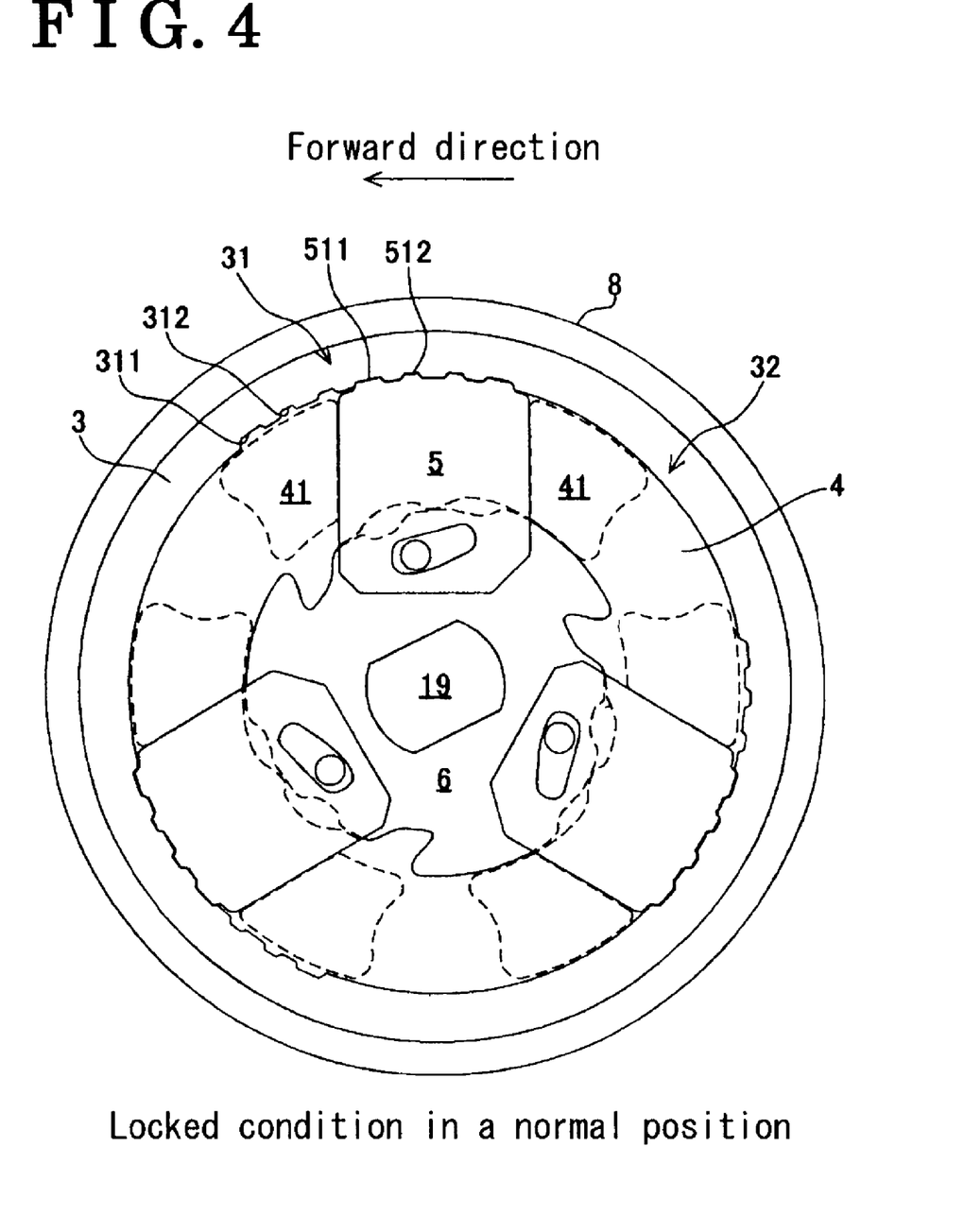
FIG. 4 illustrates a locked condition of the lock mechanism of the seat apparatus according to the embodiment of the present invention viewed the upper arm when the seat back is in a normal position (a seated position)

As illustrated in FIGS. 3 and 4, each of the internal tooth sections 31 includes wide-width radially recessed teeth 311 and narrow-width radially recessed teeth 312 which are smaller than the wide-width recessed teeth 311. As seen in FIG. 3A, the wide-width receded teeth 311 and the narrow-width recessed teeth 312 are continuously formed in a predetermined range in the following clockwise order: the wide-width recessed tooth 311, the narrow-width recessed tooth 312, the narrow-width recessed tooth 312, the wide-width recessed tooth 311, the narrow-width recessed tooth 312, the narrow-width recessed tooth 312, and the wide-width recessed tooth 311.

The circular arc portions 32 are formed between a plurality of the internal tooth sections 31 in the upper gear 3. No recessed and raised portions exist on each of the circular arc portions 32. A diameter of a circle defined by each of the circular arc portions 32 is smaller than a tooth-tip diameter of each of the internal tooth sections 31, thereby releasing a locked condition of the lock mechanism 2 of the seat back 13A. Accordingly, when the upper gear 3 is rotated, external tooth sections 51 circumferentially arranged at the pawl gears 5 described below slide on the circular arc portions 32 without fitting in the internal tooth sections 31. Consequently, the seat back 13A is smoothly folded forward. In addition, the diameter of the circle defined by the circular portions 32 may be equal to the tooth-tip diameter of the internal tooth section 31.

The lower plate 4 has a diameter that is approximately equal to a diameter of the recessed portion disposed at the most exterior side on the upper gear 3. The lower plate 4 includes a dish shape having a recessed portion facing the recessed portions of the upper gear 3. The recessed portion of the lower plate 4 overlaps the recessed portions of the upper gear 3 so as to face each other. A through-hole 40 through which the second hinge shaft 19 extends is formed in the center of the recessed portion of the lower plate 4. The lower plate 4 includes six circular raised portions (not shown) formed at an axially opposite surface of the recessed portion. Guiding portions 41 for guiding the pawl gears 5 are also formed in the recessed portion so as to face the upper gear 3. The circular raised portions are fitted in the intermediate arm 14 so as to be fixed thereto, thereby restraining the lower plate 4 from relatively rotating to the intermediate arm 14. The guiding portions 41 are configured in pairs and disposed at three locations keeping an equal space of approximately 120 degrees from one another on the lower plate 4. Gear slide surfaces 411 are provided respectively at side faces of the guiding portions 41 in pairs facing each other. Each of the pawl gears 5 is slidably held in a radial direction by the gear slide surfaces 411.

Three of the pawl gears 5 are disposed on the lower plate 4. The pawl gears 5 are supported slidably in the radial direction by the guiding portions 41 of the lower plate 4 respectively. Each of the pawl gears 5 includes an external tooth section 51, guide slide surfaces 52, a guide slot 53, and a cam slide surface 54. The external tooth section 51 is located on the outer peripheral surface of the pawl gear 5 and includes wide-width teeth 511 and narrow-width teeth 512 engaging with the wide-width recessed teeth 311 and the narrow-width recessed teeth 312. The wide-width teeth 511 and the narrow-width teeth 512 are continuously formed on the outer periphery of the external tooth section 51 of the pawl gear 5 in the following order: the wide-width tooth 511, the narrow-width tooth 512, the narrow-width tooth 512, and the wide-width tooth 511.

The guide slide surfaces 52 are disposed at both sides of the pawl gear 5 and slide between the gear slide surfaces 411 of the guiding portions 41 in pairs facing each other. The guide slot 53 is located oppositely from the external tooth section 51 on the pawl gear 5 while being formed obliquely relative to a circumferential direction. Cam projections 61 disposed on the cam 6 described below are guided by the respective guide slots 53 disposed on the pawl gears 5. The cam slide surface 54 of the pawl gear 5 is located between the guide slot 53 and the external tooth section 51. Raised and recessed shapes are formed on the cam slide surface 54 to be located thereon from one side to the other side in substantially a circumferential direction as illustrated in FIG. 3A. The raised and recessed shapes face an outer peripheral surface 62 of the cam 6, thereby configuring a cam mechanism.

A through-hole 60 is formed in the cam 6. The cam 6 includes the cam projections 6 and the outer peripheral surface 62. The through-hole 60 is an opening formed in the center of the cam 6 through which the second hinge shaft 19 extends. The cam 6 is rotated integrally with the second hinge shaft 19 when the second hinge shaft 19 is fitted into the opening of the through-hole 60. The three cam projections 61 are disposed on the cam 6 while keeping an equal space of approximately 120 degrees from one another. The three cam projections 61 extend toward the upper arm 13. Each of the cam projections 61 is fitted into the guide slot 53 of the pawl gear 5 so as to slidably engage therewith. The outer peripheral surface 62 of the cam 6 forms the raised and recessed shapes and contacts the cam slide surfaces 54 of the pawl gears 5, thereby configuring the cam mechanism.

The spiral spring 7 is positioned between an inner circumferential portion of the lower plate 4 and the cam 6 so that the second hinge shaft 19 is biased counterclockwise (as seen in FIG. 3) by an end portion of the spiral spring 7. The ring 8 is located at an outer peripheral side of each of the upper gear 3 and the lower plate 4 so that the pawl gears 5, the cam 6, and the spiral spring 7 are accommodated between the upper gear 3 and the lower plate 4. The ring 8 is a ring-shaped member for keeping the upper gear 3 and the lower plate 4 without separating from each other and allowing relative rotation therebetween. The upper gear 3 and the lower plate 4 are held coaxially by the ring 8, so that the cam 6 is included also coaxially between the upper gear 3 and the lower plate 4 via the ring 8. Accordingly, the lock mechanism 2 is unitized. The through-holes 30, 40, and 60 of the upper gear 3, the lower plate 4, and the cam 6 respectively are coaxially aligned, so that the lock mechanism 2 is easily assembled to the second hinge shaft 19. Consequently, high assemblability of the lock mechanism 2 relative to the vehicle seat 11 is ensured.

An actuation of the seat apparatus 1 configured as described above will be explained with reference to FIGS. 4 to 7. FIG. 4 illustrates the locked condition of the lock mechanism 2 when the seat back 13A is located in a normal position (a seated position). In FIGS. 4 to 7, the second hinge shaft 19 is biased counterclockwise by the spiral spring 7. The cam 6 is biased also counterclockwise by the spiral spring 7. When the cam 6 is biased counterclockwise by the spring 7, the pawl gears 5 are biased radially outwardly by the outer peripheral surface 62 of the cam 6, so that the external tooth section 51 of each of the pawl gears 5 engages with each of the internal tooth sections 31 of the upper gear 3. When the seat back 13A is located in the normal position (the seated position), the external tooth section 51 of each of the pawl gears 5 engages with one side (in a clockwise direction) of each of the internal tooth sections 31 of the upper gear 3. Accordingly, a relative rotation between the upper gear 3 and the pawl gears 5 is restrained because the internal tooth sections 31 of the upper gear 3 engage with the external tooth sections 51 of the pawl gears 5. A relative rotation between the pawl gears 5 and the lower plate 4 is restrained because each of the pawl gears 5 is guided between the guiding portions 41 of the lower plate 4 so as to be restrained from moving in a circumferential direction. Consequently, a relative rotation between the upper gear 3 and the lower plate 4 that is a relative rotation between the upper arm 13 and the intermediate arm 14 is restrained.

Figure 5:
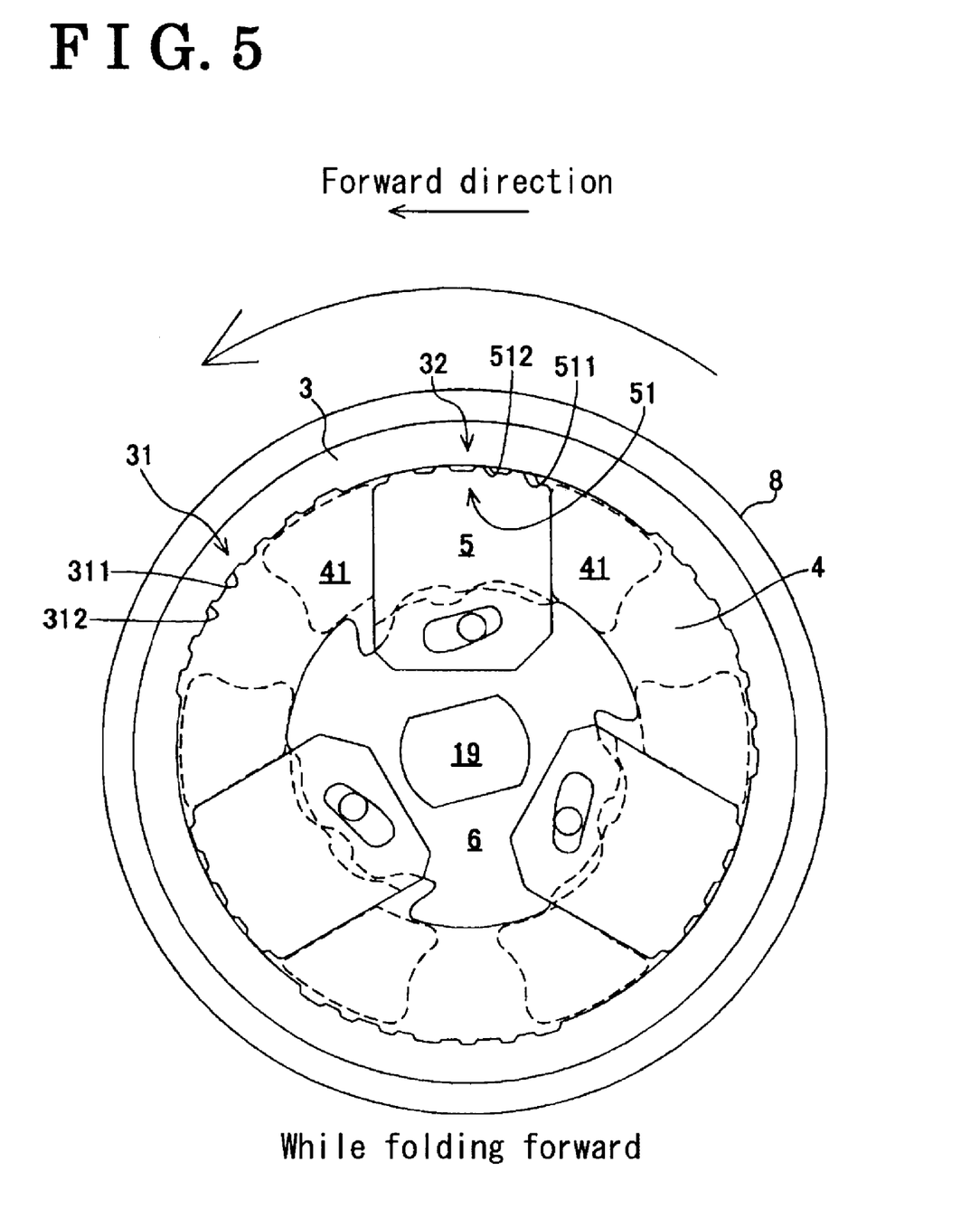
FIG. 5 illustrates the lock mechanism of the seat apparatus according to the embodiment of the present invention viewed from the upper arm while the seat back is being folding forward.

Under this condition, as illustrated in FIG. 5, the second hinge shaft 19 connected to a lever (not shown) for folding the seat back 13A forward is rotated clockwise by operating the lever, thereby rotating the cam 6 fixed to the second hinge shaft 19 in the same clockwise direction as the second hinge shaft 19. At this time, the pawl gears 5 slide radially inwardly while the cam projections 6 formed on the cam 6 slides in the respective guide slots 53 according to rotation of the cam 6. Accordingly, the external tooth section 51 of each of the pawl gears 5 is disengaged from each of the internal tooth sections 31 of the upper gear 3, so the locked condition of the lock mechanism 2 is released. Consequently, the upper gear 3 supported by the upper arm 13 is rotated in the counterclockwise direction indicated by the arrow in FIG. 5, so that the upper arm 13 is tilted counterclockwise. When the upper arm 13 is tilted forward and the upper gear 3 is rotated counterclockwise, the internal tooth sections 31 of the upper gear 3 are shifted counterclockwise at the same time the wide-width recessed teeth 311 and the narrow-width recessed teeth 312 of the internal tooth sections 31 of the upper gear 3 do not face the wide-width teeth 511 and the narrow-width teeth 512 of the pawl gears 5 respectively. Accordingly, the internal tooth sections 31 are not allowed to continuously engage with the external tooth sections 51 even when the lever is continuously operated in order to fold the seat back 13A forward. Consequently, operation for folding the seat back 13A forward is continued without operating the lever. When the operation for folding the seat back 13A forward is further continued, tooth tips of the external tooth sections 51 slide on the circular arc portions 32.

Figure 6:
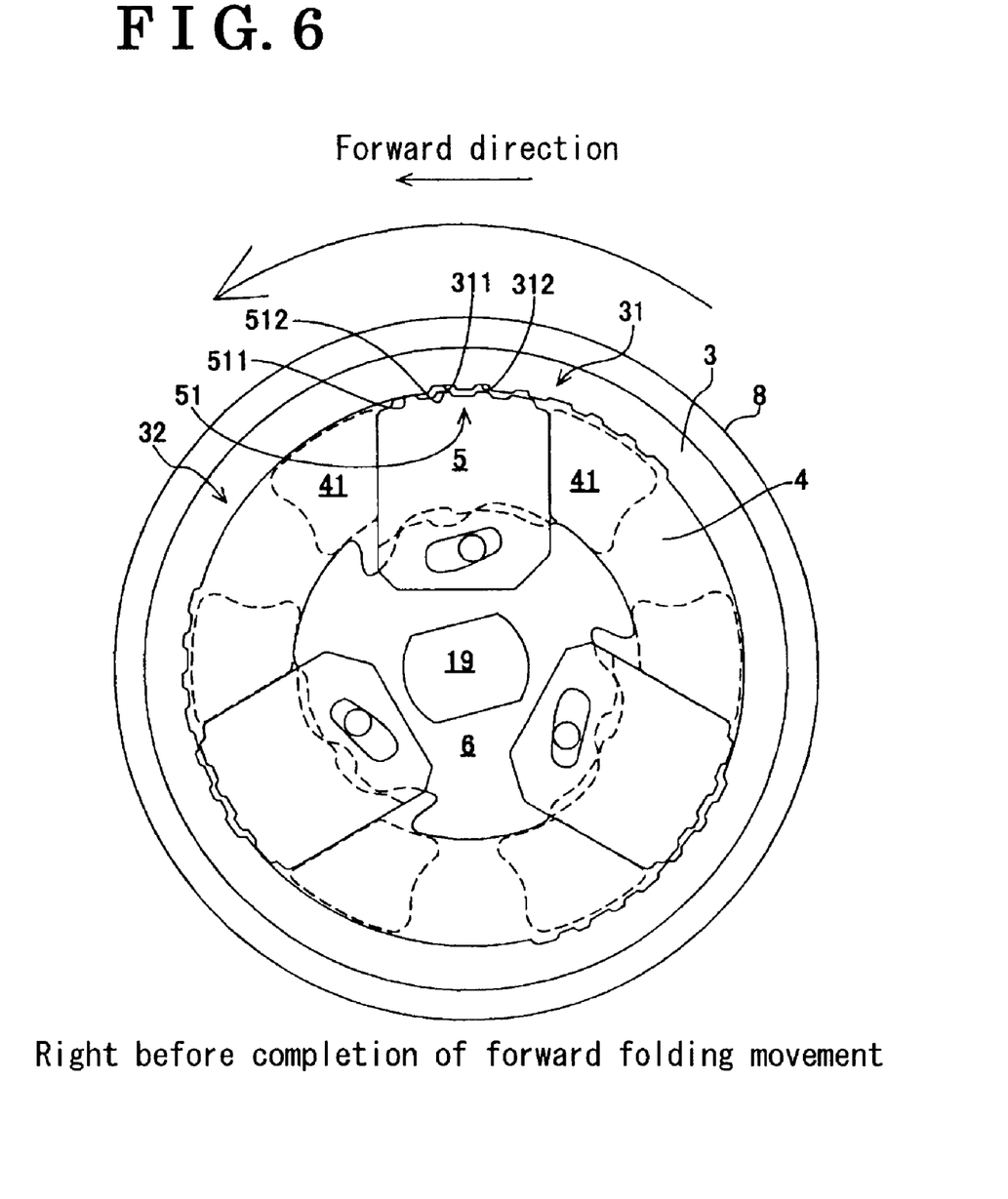
FIG. 6 illustrates a condition of the lock mechanism of the seat apparatus according to the embodiment of the present invention viewed from the upper arm right before completion of a forward folding movement of the seat back.
Figure 7:
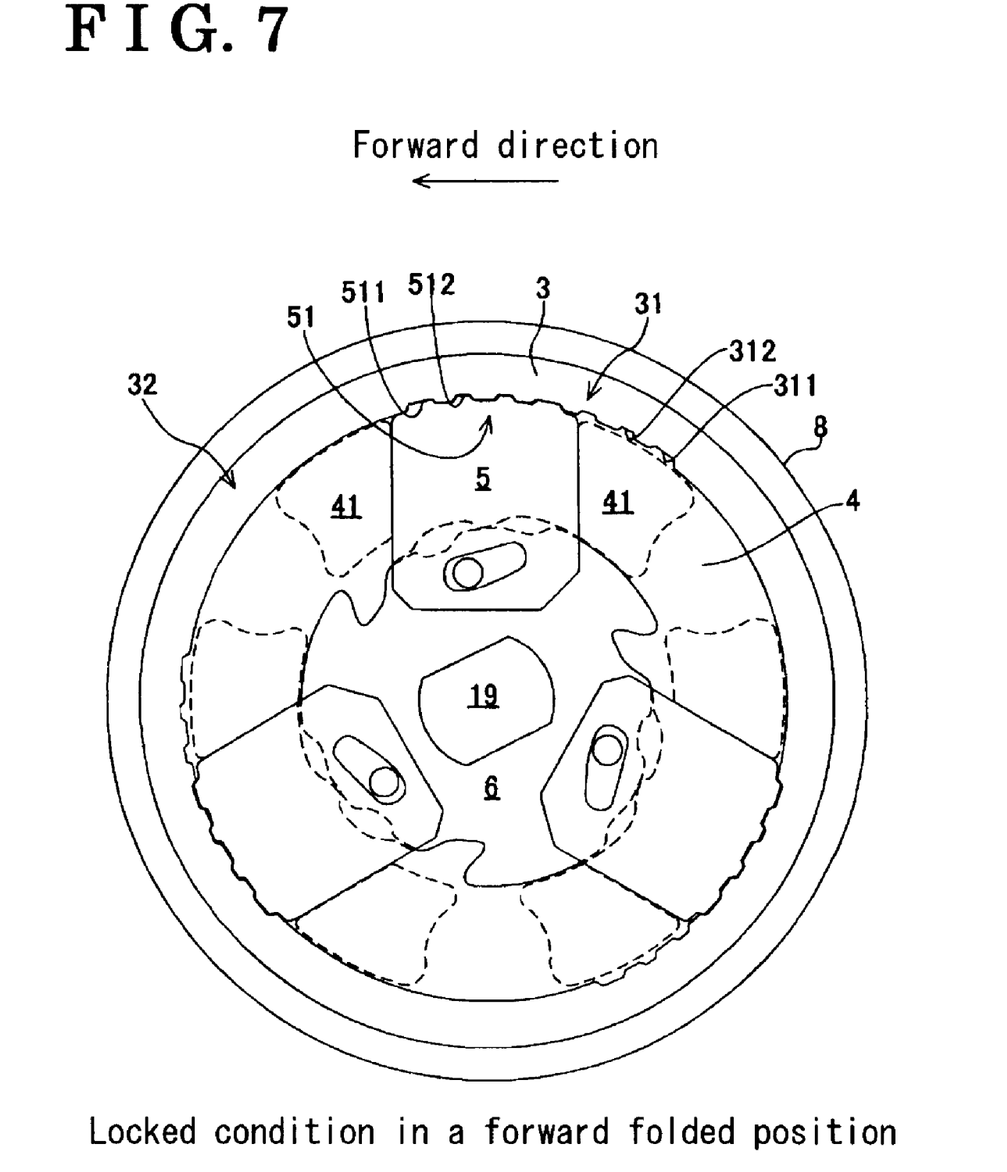
FIG. 7 illustrates a locked condition of the lock mechanism of the seat apparatus according to the embodiment of the present invention viewed from the upper arm when the forward folding movement of the seat back is completed.

FIG. 6 illustrates a condition of the lock mechanism 2 right before the forward folding movement of the seat back 13A is completed. In the FIG. 6, the internal tooth sections 31 located in the counterclockwise direction are rotated so as to engage with the external tooth sections 51 of the pawl gears 5 that are not shifted in a rotation direction of the upper gear 3. First, the external tooth sections 51 start facing the circular arc portion 32 and then facing the internal tooth sections 31. At this time, the wide-width tooth 511 of each of the external tooth sections 51 positioned in a clockwise direction faces the wide-width recessed tooth 311 of each of the internal tooth sections 31 positioned in the counterclockwise direction. The wide-width tooth 511 and the wide-width recessed tooth 311 have the same width and engage with each other in a width direction. However, the pawl gears 5 are not firmly attached to the internal tooth sections 31 when other teeth of the external tooth sections 51 are located at the circular arc portions 32. Accordingly, the external tooth sections 51 of the pawl gears 5 do not engage with the internal tooth sections 31 of the upper gear 3.

When the upper gear 3 is continuously rotated counterclockwise, the wide-width tooth 511 positioned in the clockwise direction faces the narrow-width recessed tooth 312 positioned in the counterclockwise direction. The wide-width recessed tooth 511 does not engage with the narrow-width recessed tooth 312 in the width direction because of different widths. In this case, the internal tooth sections 31 of the upper gear 3 do not fit into the external tooth sections 51 of the pawl gears 5.

Afterward, when the upper gear 3 is further continuously rotated counterclockwise, the wide-width recessed tooth 311 of each of the internal tooth sections 31 positioned in the counterclockwise direction passes the two narrow-width teeth 512 of each of the external tooth sections 51. Then, when the wide-width recessed tooth 311 positioned in the counterclockwise direction is moved to a position in which the wide-width recessed tooth 311 positioned in the counterclockwise direction faces the wide-width tooth 511 positioned in the counterclockwise direction, the pawl gears 5 slide radially outwardly because a shape of the wide-width recessed teeth 311 is identical to a shape of the wide-width tooth 511. Accordingly, the internal tooth sections 31 engage with the external tooth sections 51, so that the upper arm 13 is locked at a forward folded position. Consequently, the upper arm 13 of the vehicle seat 11 is locked at the forward folded position as illustrated in FIG. 2.

Adversely, when the upper arm 13 is tilted rearward to the seated position, the second hinge shaft 19 connected to the lever is rotated clockwise by operating the lever, thereby rotating the cam 6 fixed to the second hinge shaft 19 in the same clockwise direction as the second hinge shaft 19. At this time, the cam mechanism enables the pawl gears 5 to slide radially inwardly to a central point of the cam 6, so that the locked condition of the lock mechanism 2 is released. Hereby, the upper arm 13 is tilted rearward to the seated position and the upper gear 3 supported by the upper arm 13 is rotated clockwise. That is, the internal tooth sections 31 of the upper gear 3 are rotated in a direction opposite to a direction when the upper arm 13 is tilted forward, so that the lock mechanism 2 is locked and returned to a position where the seat back 13A is in the normal position (the seated position) illustrated in FIG. 4. At this time, each of the internal tooth sections 31 including teeth with different face widths do not engage with each of the external tooth sections 51 including teeth with different face widths until the upper gear 3 is rotated to a position where the teeth with the same face widths of the internal tooth section 31 and the external tooth section 51 face each other.

According to the seat apparatus 1 of the embodiment, the internal tooth sections 31 and the external tooth sections 51 included in the lock mechanism 2 are configured so as to engage with each other when the wide-width recessed tooth 311 and the narrow-width recessed tooth 312 having different face widths are circumferentially aligned with respective sets of the wide-width tooth 511 and the narrow-width tooth 512 having different face widths. Accordingly, the internal tooth section 31 and the external tooth section 51 do not engage with each other in the process of rotation because teeth with the different face widths of the internal tooth section 31 and the external tooth section 51 face each other. Consequently, the internal tooth sections 31 are prevented from fitting in the external tooth sections 51 until the upper gear 3 reaches a predetermined position where the same width teeth of the internal tooth section 31 and the external tooth section 51 face each other. As a result, the seat back 13A is smoothly tilted forward and rearward and high operationality is secured.

In addition, the lock mechanism 2 is integrally assembled by means of the ring 8 so as to form a round-shaped unit. The lock mechanism 2 is assembled to the vehicle seat 11 by fixing the circular raised portions of the upper gear 3 to the upper arm 13 and fixing the circular raised portions of the lower plate 4 to the intermediate arm 14. Accordingly, the lock mechanism 2 is easily assembled to the vehicle seat 11. Furthermore, strength is secured because the lock mechanism 2 is integrally assembled and unitized. In particular, the lock mechanism 2 is highly resistive against a load in a vehicle width direction.

According to the aforementioned embodiment, the wide-width recessed teeth 311 are disposed at both ends of each of the internal tooth sections 31 and the narrow-width recessed teeth 312 are disposed in the central part of the internal tooth section 31. In the same way, the wide-width teeth 511 are disposed at both ends of each of the external tooth sections 51 and the narrow-width teeth 512 are disposed in the central part of the external tooth section 51. Alternatively, other combinations of wide-width teeth and narrow-width teeth may be applied. For example, teeth with all different face widths may be applied to the internal tooth section 31 and the external tooth section 51.

In addition, according to the embodiment, the three internal tooth sections 31 of the upper gear 3 are disposed on the inner circumferential surface and the three pawl gears 5 are applied in the upper gear 3. Alternatively, the two internal tooth sections may be disposed on the inner circumferential surface while keeping a 180 degrees space from each other and the three pawl gears 5 may be applied. Further, the four or more internal tooth sections may be disposed on the inner circumferential surface and the four or more pawl gears 5 may be applied.

As explained above, in the seat apparatus 1 according to the embodiment, the internal tooth section 31 including teeth with the different face widths and do not engage with the external tooth section 51 including teeth with the different face widths until the upper gear 3 is rotated to a position where the same width teeth of the internal tooth section 31 and the external tooth section 51 face each other. On the other hand, when the same width teeth of the internal tooth section 31 and the external tooth section 51 face each other, the internal tooth section 31 and the external tooth section 51 engage with each other. As a result, the lock mechanism 2 is surely locked. In addition, during actuation of the lock mechanism 2, the teeth of the internal tooth section 31 and the teeth of the external tooth section 51 neither engage with each other nor fit into each other between a locked condition and a released condition of the lock mechanism 2. Accordingly, the seat back 13A is smoothly tilted forward and rearward and high operationality is ensured while the seat back 13A is operated.

In addition, since the different-width internal and external teeth are applied and nonuniformly aligned, the internal tooth section 31 does not easily fit in the external tooth section 51 even when sizes of the teeth are enlarged. Accordingly, the sizes of the teeth may be enlarged and moldability of the upper gear 3 and the pawl gear 5 is improved.

Furthermore, the upper gear 3 and the pawl gear 5 are included in the lock mechanism 2. The internal tooth section 31 is formed on the inner circumferential surface of the upper gear 3 while the external tooth section 51 is formed on the outer peripheral surface of the pawl gear 5. The pawl gear 5 is disposed on the inner side of the upper gear 3. Accordingly, the lock mechanism 2 may be unitized so as to form a round-shaped unit by assembling the upper gear 3 and the pawl gear 5 as required.

Further, according to the seat apparatus 1 described in the embodiment, the upper gear 3 includes the circular arc portion 32 having the diameter that is equal to or smaller than the tooth-tip diameter of the internal tooth section 51.

In addition, no recessed and raised portions exist on the circular arc portion 32, thereby releasing a locked condition of the lock mechanism 2 of the seat back 13A. When the upper gear 3 is rotated, the external tooth section 51 formed at the pawl gear 5 slides on the circular arc portion 32 without fitting in the internal tooth section 32. Furthermore, while the pawl gear 5 is attached to the circular arc potion 32, the internal tooth section 32 and the external tooth section 51 do not fit in each other. Consequently, the seat back 13A is smoothly folded forward.

Still further, according to the seat apparatus 1 described in the embodiment, the upper gear 3, the lower plate 4, and the pawl gear 5 are held by the ring 8.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat apparatus for a vehicle, comprising:
   a seat cushion;
   a lower arm supported on the seat cushion;
   a seat back;
   an upper arm supported on the seat back;
   an intermediate arm having a first hinge shaft and a second hinge shaft on which the lower arm and the upper arm are rotatably mounted, respectively;
   a reclining mechanism disposed between the lower arm and the intermediate arm, the reclining mechanism selectively restraining and allowing the intermediate arm to rotate around the first hinge shaft relative to the lower arm for adjusting a tilt angle of the seat back relative to the seat cushion within a predetermined angular range; and
   a lock mechanism disposed between the intermediate arm and the upper arm, the lock mechanism selectively restraining and allowing the upper arm to rotate around the second hinge shaft relative to the intermediate arm for establishing a forward folding movement of the seat back onto the seat cushion;
   the lock mechanism including a first plate member, a second plate member, and a pawl gear,
   the first plate member being fixed to one of the upper arm and the intermediate arm, the first plate member being provided therein with a plurality of circumferentially spaced internal tooth sections each of which has a plurality of teeth with different face widths,
   the second plate member fixed to the other one of the upper arm and the intermediate arm, the second plate member supported by the first plate member to rotate relative thereto,
   the pawl gear slidably supported by the second plate member and having a circumferentially arranged external tooth section each of which has a plurality of teeth with different face widths for engaging with and disengaging from one of the internal tooth sections.

2. The seat apparatus for a vehicle according to claim 1, wherein the first plate member includes a circular arc portion having a diameter which is equal to or smaller than a tooth-tip diameter of the internal tooth section.

3. The seat apparatus for a vehicle according to claim 1, wherein the first plate member, the second plate member, and the pawl gear are held by a ring.

* * * * *